Patented Mar. 30, 1926.

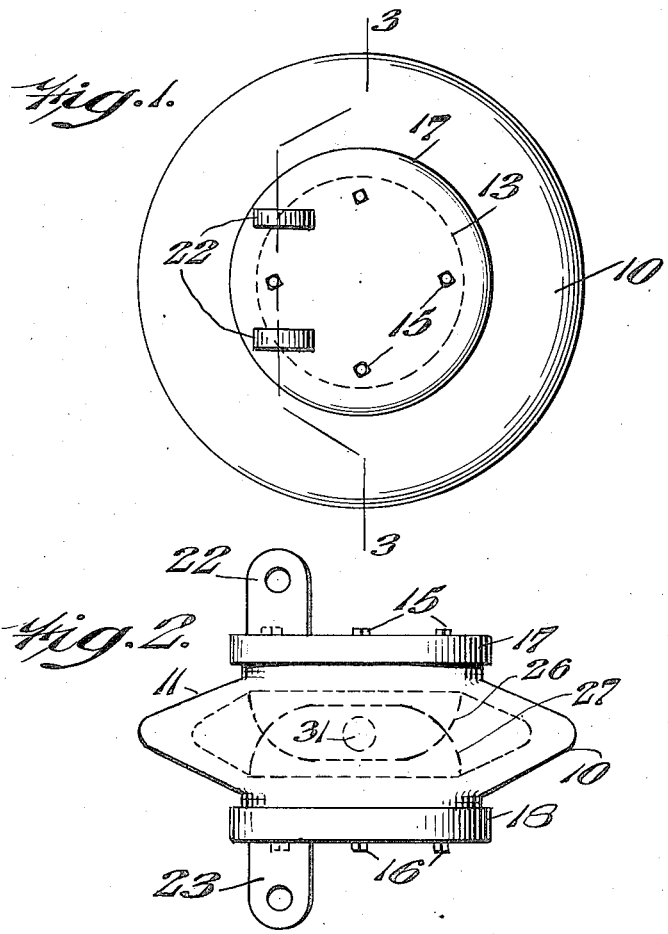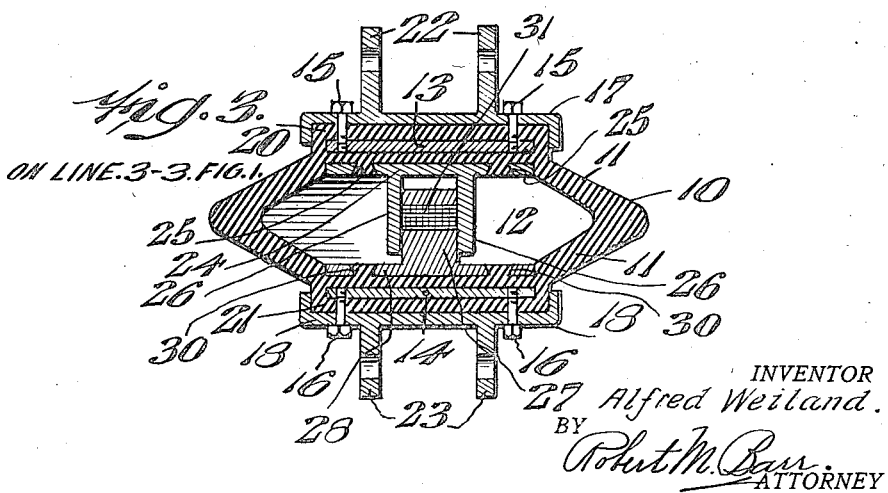

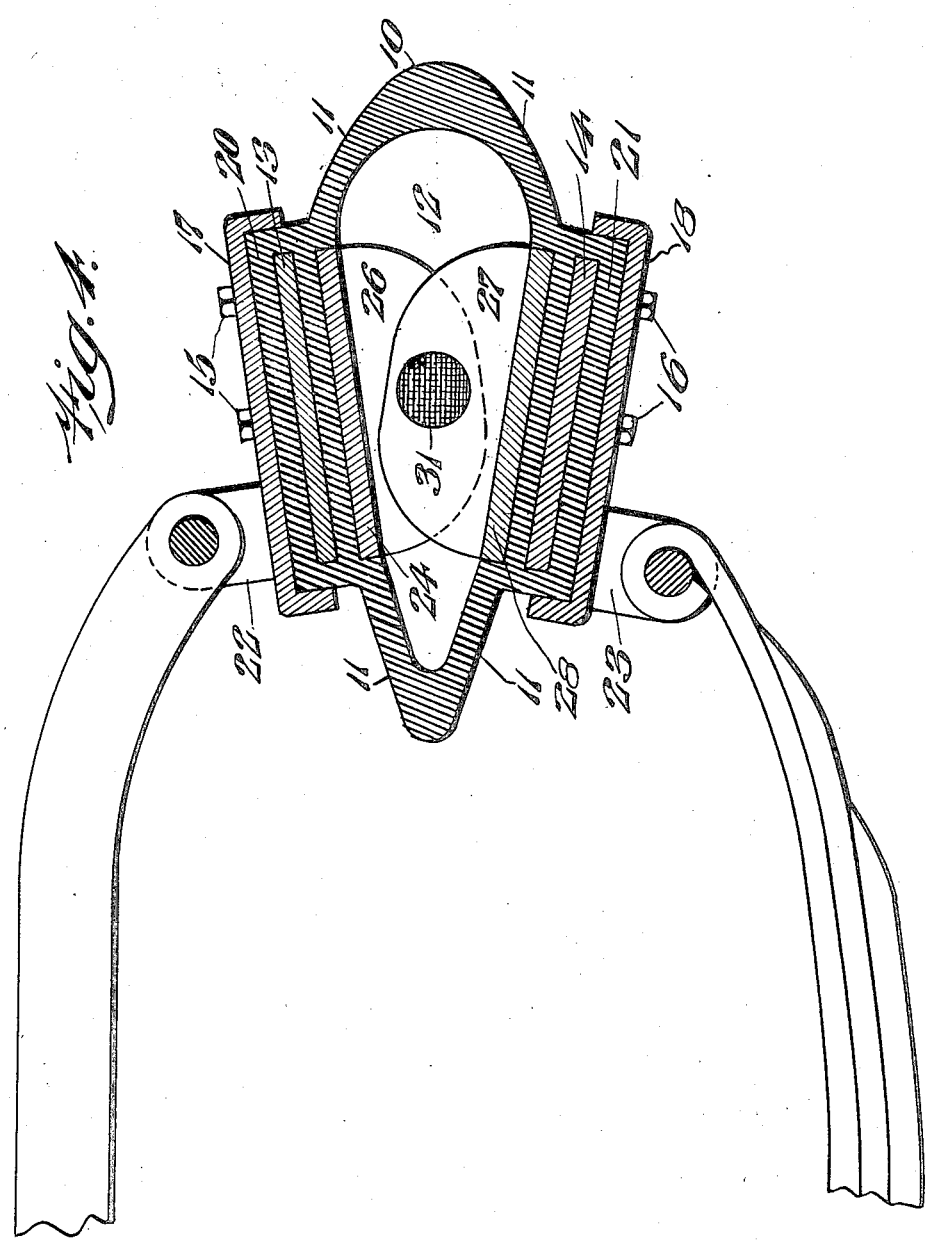

1,579,185

UNITED STATES PATENT OFFICE.

ALFRED WEILAND, OF EAST ORANGE, NEW JERSEY.

SHOCK ABSORBER.

Application filed November 1, 1924. Serial No. 747,213.

*To all whom it may concern:*

Be it known that I, ALFRED WEILAND, a citizen of the United States, and a resident of East Orange, county of Essex, State of New Jersey, have invented certain new and useful Improvements in Shock Absorbers, of which the following is a specification.

The present invention relates to shock absorbers, and more particularly to an improvement upon a pneumatic type of absorber.

Some of the objects of the present invention are to provide an improved means for supplementing the action of the springs of a vehicle so that impacts transmitted to the wheels are neutralized before reaching the vehicle frame; to provide a pneumatic shock absorber having improved characteristics; to provide a shock absorber and mounting therefor which functions to automatically resist side sway of the vehicle with respect to its wheels; to provide an improved pneumatic shock absorber wherein impact forces are automatically distributed and gradually reduced to a negligible value; to provide a shock absorber construction of the inflated type wherein the medium under pressure is subjected under shock conditions to a displacement action instead of a direct compressive action; and to provide other improvements as will hereinafter appear.

In the accompanying drawings, Fig. 1 represents a plan of a shock absorber embodying one form of the present invention; Fig. 2 represents a side elevation of the same showing structural details in dotted lines; Fig. 3 represents a section on line 3—3 of Fig. 2; and Fig. 4 represents an enlarged section showing the device under compression.

Referring to the drawings, one form of the present invention comprises a shock and rebound absorbing means of the general type described in co-pending application, Serial No. 695,204, comprising a pneumatic compression and expansion member 10, of rubber or other suitable material, which in plan is of circular contour and in section of hollow construction with inwardly diverging side walls 11 forming an interior chamber 12 into which air under pressure is introduced.

In order to support the member 10 between a fixed part of the vehicle frame and a movable part, such for example as a pneumatic substitute for the ordinary spring shackles, and also to strengthen and reinforce the body of the member 10, metal discs 13 and 14 are molded into the opposite ends of the member 10 and serve respectively to receive stud bolts 15 and 16 by which cap plates 17 and 18 are held in position at opposite sides of the body. These cap plates 17 and 18 respectively fit snugly over heads 20 and 21, which, in effect, are the body part of the member 10 of which the walls 11 are an integral part. In this manner the head ends of the member 10 are held against lateral movement and prevent relative movement between the flexible member and its fastening means. As here shown, the cap plates 17 and 18 are provided respectively with outwardly disposed apertured lugs 22 and 23, one pair for each cap plate, in order that the opposite ends of the member 10 can be mounted by shackle bolts or other fastening means to a fixed part of the vehicle frame on one side and to a spring or movable part on the opposite side.

For the purpose of obtaining the maximum shock absorbing properties of the device, the pairs of attaching lugs 22 and 23 are located to one side of the vertical axis of the member 10 and in substantial alinement with each other. This construction causes the applied compressive force to act upon a cushioning area relatively smaller than if it were applied in the vertical plane passing through the axis of the member 10. In devices of this character heretofore employed the compressive forces act directly in the plane of the axis and as a result the enclosed compressed medium is forced laterally with equal pressure and is restricted only by the side bounding walls, so that while there is some shock absorption it is not the most effective that can be obtained. By the present construction, with the impact receiving lugs located between the central portion and a side edge of the member 10, the foregoing loss in absorption efficiency is overcome because the compressed medium is free to expand both laterally and vertically upward and downward, thus bringing into play the full resiliency of the device. The action becomes more in the nature of a bellows action instead of a collapsing one because only the air at one part is compressed, and this, instead of being held without escape between two approaching surfaces, is free to expand into the larger side of the device. The entire shock absorbing operation is more in the nature of a forward and backward flow of a compressible medium which gradually compensates for and reduces the shock, instead of one which is characterized by an abrupt ending of a transmitted impact. This flowing of the medium within the member 10 in simulation of a breathing action is assisted by the varying thickness of the walls 11 of the member, and it will be noted that the circumferential apex of the walls is relatively thick and tapers to a thinner construction on the upper and lower surface of the member 10. This thinner walled portion gives rather readily under the increased expanding pressure of the contained medium and results in a maximum reduction of the transmitted shock.

As a means for counteracting side sway or motion parallel to the plane of the horizontal axis of the member, a plate 24 is molded into the surface of the inner wall of the head 20 by providing openings 25 which are filled by the rubber or other material during the molding process. Transversely disposed across the exposed face of the plate 24 are two flanges 26 arranged in parallel relation and so spaced as to receive a relatively thick flange 27 snugly between them for sliding movement. The flange 27 is formed integral with a plate 28 molded into the surface of the inner wall of the head 21 by providing openings 30 to be filled with the rubber or other material. These interfitting flanges 26 and 27 are disposed at right angles with respect to side thrust and consequently any tendency of the flexible member to move sidewise is prevented. Preferably the flange 27 has an insert 31 of graphite composition or other suitable lubricant which serves to permit the free sliding of the flanges without loss due to friction.

It should be noted that the member 10 is molded with a medium compressed therein and under such pressure as will permit proper yielding to relieve shock but will resist yielding beyond an abnormal maximum. For all practical purposes this enclosed pressure allows flexing within all necessary limits but its compressibility ceases before the plate flanges 26 and 27 abut respectively the parts 24 and 28. In other words the maximum impact will be relieved before either of the plate flanges 26 and 27 strike the opposed faces. Normally the device assumes the position shown in Fig. 2, while in Fig. 4 it is shown substantially under maximum working conditions.

Having thus described my invention, I claim:

1. In a shock absorber, the combination of a hollow member containing a compressible medium, means for respectively connecting opposite ends of said member to a fixed part of a vehicle and to a spring actuated part of said vehicle, and means molded within said member for resisting movement, in a predetermined direction, of one part of said member with respect to another part.

2. In a shock absorber, the combination of a hollow member containing a compressible medium, means for respectively connecting opposite ends of said member to a fixed part of a vehicle and to a spring actuated part of said vehicle, and means including interfitting flanges molded within said member for resisting movement, in a predetermined direction, of one part of said member with respect to another part.

3. In a shock absorber, the combination of a hollow member containing a compressible medium, means for respectively connecting opposite ends of said member to a fixed part of a vehicle and to a spring actuated part of said vehicle, a flange depending interiorly of said member and disposed transverse to the direction of normal side thrusts, and a second flange connected to an opposite portion of said member and abutting said first flange, whereby relative side to side movement of said member parts is prevented.

4. In a shock absorber, the combination of a hollow member containing a compressible medium, means for respectively connecting opposite ends of said member to a fixed part of a vehicle and to a spring actuated part of said vehicle, a flange depending interiorly of said member and disposed transversely to the direction of normal side thrusts, a second flange connected to an opposite portion of said member and abutting said first flange, whereby relative side to side movement of said member parts is prevented, and lubricating means for the joint between said flanges.

5. In a shock absorber, the combination of a hollow member containing a compressible medium and formed with two oppositely disposed heads, means for respectively connecting said heads to a fixed part of a vehicle and to a spring actuated part of said vehicle, a plate molded into one of said heads having two spaced flanges projecting therefrom and extending within said member transverse to the direction of normal side thrust, and a plate molded into the other of said heads having a flange interfitting with said first plate flanges, whereby side to side movement of said member is prevented.

6. In a shock absorber, the combination of a hollow member containing a compressible medium and formed with two oppositely disposed heads, means for respectively connecting said heads to a fixed part of a vehicle and to a spring actuated part of said vehicle, a plate molded into one of said heads having two spaced flanges projecting therefrom and extending within said member transverse to the direction of normal side thrust, a plate molded into the other of said heads having a flange interfitting with said first plate flanges whereby side to side movement of said member is prevented, and means for lubricating the contact faces of said flanges.

7. In a shock absorber, the combination of a hollow member containing a compressible medium, and means for connecting said member between a fixed part and a spring actuated part whereby transmitted impacts cause one portion of said hollow member to be compressed and another portion thereof to expand.

Signed at Philadelphia, county of Philadelphia, State of Pennsylvania, this 22nd day of October, 1924.

ALFRED WEILAND.